United States Patent
Metcalf (10) Patent No.: US 7,787,580 B2
(45) Date of Patent: Aug. 31, 2010

(54) METHODS AND SYSTEMS FOR JITTER MANAGEMENT AND LATENCY COMPENSATION IN A PACKET-BASED SYSTEM

(75) Inventor: Thomas D. Metcalf, Philadelphia, PA (US)

(73) Assignee: Aviom, Inc., West Chester, PA (US)

( * ) Notice: Subject to any disclaimer, the term of this patent is extended or adjusted under 35 U.S.C. 154(b) by 701 days.

(21) Appl. No.: 11/539,258

(22) Filed: Oct. 6, 2006

(65) Prior Publication Data

US 2007/0127405 A1 Jun. 7, 2007

Related U.S. Application Data

(60) Provisional application No. 60/724,340, filed on Oct. 6, 2005, provisional application No. 60/724,312, filed on Oct. 6, 2005.

(51) Int. Cl.
*H04L 7/00* (2006.01)

(52) U.S. Cl. .......................... 375/371; 375/226; 375/299; 370/516; 702/69

(58) Field of Classification Search ................. 375/354, 375/356, 358, 299, 226, 371; 370/516; 702/69
See application file for complete search history.

(56) References Cited

U.S. PATENT DOCUMENTS

| 4,807,259 | A | * | 2/1989 | Yamanaka et al. .......... 375/358 |
| 5,261,118 | A | | 11/1993 | Vanderspool, II et al. |
| 5,835,668 | A | | 11/1998 | Yanagihara |
| 6,470,031 | B1 | | 10/2002 | Loy et al. |

OTHER PUBLICATIONS

U.S. Appl. No. 10/055,918, filed Mar. 13, 2003, Marinescu et al.
U.S. Appl. No. 10/436,785, filed Dec. 4, 2003, Wiebe.

* cited by examiner

*Primary Examiner*—Mohammad H Ghayour
*Assistant Examiner*—Leila Malek
(74) *Attorney, Agent, or Firm*—Pepper Hamilton LLP (57) ABSTRACT

Method and systems for aligning a clock at a second device based on a reference clock at a first device and reducing clock rate jitter between asynchronous devices in a network are disclosed. A transmission latency may be determined between the first device and the second device. A data packed may be received containing information pertaining to the reference clock at the second device. The phase of the clock may then be adjusted at the second device based on the information contained in the packet and the transmission latency.

6 Claims, 9 Drawing Sheets

METHODS AND SYSTEMS FOR JITTER MANAGEMENT AND LATENCY COMPENSATION IN A PACKET-BASED SYSTEM

CLAIM OF PRIORITY AND RELATED APPLICATIONS

This application is related to and claims priority from pending U.S. Provisional Application Ser. No. 60/724,312, entitled "Jitter Management" and filed Oct. 6, 2005, and pending U.S. Provisional Application Ser. No. 60/724,340, entitled "Latency Compensation" and filed Oct. 6, 2005, each of which is incorporated herein by reference in its entirety.

BACKGROUND

Various audio and video system manufactures have attempted to provide a multi-channel networking system of audio and/or video devices, where digital audio can be inserted and extracted at various locations within the network. Typically, such systems have routed digital audio as data in a standard Ethernet switched-packet network. While such approaches take advantage of readily available components, they do not perform adequately for real-time streaming media for a number of reasons.

For example, most switched packet systems require a star topology, where every device is connected to a central "server." As such, every device requires a separate cable connecting it to the server. This is a sub-optimal configuration, due to cable cost and other considerations, when multiple devices are located in close proximity, but are separated from the server by a great distance.

Accordingly, serially connected networks (or sub-networks) have been used to connect neighboring devices that are in close proximity to each other. Serially connected networks can limit cable costs and renew data packet information at every device, which enables higher bandwidth and longer end-to-end data transmission distances.

One problem arises with serially connected devices, however. When transmitting information from one device to the next, a small amount of retransmission delay can occur. While such a delay does not typically affect analog audio data or non-real-time data, problems can occur with digital input/output (DIO) devices. For example, if DIO devices are aligned to a reference clock, strict rules are often enforced concerning the phase relationship of a plurality of DIO devices, such as under the AES-11 specification, which is incorporated herein by reference in its entirety. While integer clock delays between devices are permitted, fractional sample delays between two devices are not. The AES-11 specification requires transmitting devices to be within +/−5% of a sample period of the reference clock and receiving devices to receive data within +/−25% of a sample period of the reference clock. As such, for high sample rate systems, such as 208 kHz, a transmitting device is required to be within 0.24 μs (+/−6 transmit clock cycles) of the reference clock.

A second timing-related problem for serially connected systems occurs if the system generates an audio sample clock based on the rate of transmitted packets. If timing errors are introduced using this approach, such errors can accumulate in devices that are serially connected in the network. As a result, jitter and wander (low-frequency jitter) may be introduced into the packet rat e. Accordingly, jitter and wander can also occur in the audio sample rate, which can cause a digital network system to lose sample "lock," resulting in a loss of audio data.

In conventional systems, the sample rate can be communicated by means of the packet rate. The packet rate could be, for example, 0.5, 0.25 or 0.125 times the sample rate. However, the sample rate, and thus the packet rate, are asynchronous to a local transmit clock. If the transmit clock is 25 MHz, asynchronous re-clocking of a sample rate clock creates 40 ns of jitter in the transmitted packets. For conventional devices that are serially connected, each device adds an additional 40 ns of packet jitter because the transmit clocks of connected devices are asynchronous to each other. In other words, the jitter accumulates. Jitter accumulation can either impede packet retransmission or negatively affect audio quality if it is unmanaged.

Systems and methods for substantially coordinating the sample clock between asynchronous devices in an audio or video network, compensating for latency between devices that are otherwise asynchronous in order to generate sample clocks at substantially the same time, reducing the amount of jitter between asynchronous devices in a network and/or limiting the amount of jitter in a network caused by wander would be desirable.

The present embodiments are directed to solving one or more of the above-listed problems.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Thus, for example, reference to a "signal" is a reference to one or more signals and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to." All publications mentioned herein are incorporated by reference. Nothing herein is to be construed as an admission that the embodiments described herein are not entitled to antedate such disclosure by virtue of prior invention.

The disclosed embodiments are discussed with reference to the methods and systems of the Aviom Pro64™ system, described in co-pending U.S. application Ser. No. 11/252, 577, which is incorporated herein by reference in its entirety. However, it will be apparent to those of ordinary skill in the art that additional and/or alternate methods and systems may incorporate the teachings of the present disclosure, which embodiments are intended within the scope of this disclosure.

In an embodiment, a method of aligning a clock at a second device based on a reference clock at a first device may include determining a transmission latency between the first device and the second device, receiving a data packet containing information pertaining to the reference clock at the second device, and adjusting the phase of the clock at the second device based on the information contained in the data packet and the transmission latency.

In an embodiment, a method of reducing clock rate jitter between asynchronous devices in a network may include receiving a packet including a clock master packet length and a rounded clock master packet length, determining an incoming packet length by measuring the number of clock cycles required to receive the packet, determining a difference between the incoming packet length and the clock master packet length, filtering the difference using a low pass filter, updating an accumulator value by adding the filtered difference to the accumulator value, and transmitting the packet with an adjusted packet length based on at least the updated accumulator value and the rounded clock master packet length.

In an embodiment, a system for aligning a first clock to a reference clock generated at a first device may include a processor, a communications interface in communication with the processor and the first device, and a processor-readable storage medium in communication with the processor. The processor-readable storage medium may contain one or more instructions for performing a method of aligning the first clock to the reference clock. The method may include determining a transmission latency for data transmitted by the first device to the communications interface, receiving a data packet containing information pertaining in the reference clock via the communications interface, and adjusting the phase of the first clock based on the information pertaining to the reference clock and the transmission latency.

In an embodiment, a system for reducing clock rate jitter between asynchronous devices in a network may include a receive interface for receiving a packet including a clock master packet length and a rounded clock master packet length, a packet length determination module for determining an incoming packet length by measuring the number of clock cycles required to receive the packet, a comparison module for determining a difference between the meaning packet length and the clock master packet length, a low pass filter for filtering the difference, an accumulator containing an accumulator value, an update module for adding the filtered difference to the accumulator value to produce an updated accumulator value, and a transmit interface for transmitting the packet with an adjusted packet length based on at least the updated accumulator value and the rounded clock master packet length.

BRIEF DESCRIPTION OF THE DRAWINGS

Aspects, features, benefits and advantages of the embodiments described herein will be apparent with regard to the following description, appended claims and accompanying drawings where:

DETAILED DESCRIPTION

A "channel" may refer to a physical connection. For example, a 16-channel audio input device may have 16 physical channels.

Each channel may be mapped into a "slot." Each slot may correspond to a location within a packet. In other words, a slot may not be a physical element.

A "serial run" is formed when several non-merger devices are connected in series. Serial runs can be connected to merger devices like spokes of a wheel and/or between two merger devices. Two merger devices can also be directly connected to each other without any non-merger devices between them.

A "non-merger device" or "DIO device" refers to a device having two ports used within a networking system according to an embodiment. The non-merger device may additionally have an input/output physical connection for receiving or transmitting data. In some cases, one port of a non-merger device in a networking system may not be connected to another device, such as at the termination of a serial run.

A "merger device" refers to a device having three or more ports used within a networking system according to an embodiment. The merger device may additionally have an input/output physical connection for receiving or transmitting data. A merger device may merge portions of data packets received on each of its ports to create a new data packet that is transmitted from one or more ports.

A "networking system" can include any combination of merger devices and non-merger devices totaling two or more devices.

An "incoming data stream" refers to data received on an input port of a non-merger device or a merger device.

An "outgoing data stream," refers to data transmitted over an outgoing port of a non-merger device or a merger device.

The term "converting," when used with respect to data received from an input interface or data being sent to an output interface, may include, for example and without limitation, analog-to-digital conversion, digital-to-analog conversion and similar operations.

The term "packet length" refers to the time between the initiations of transmission for two consecutive packets.

The term "jitter" refers to frequency variability occurring at a rate above about 10 Hz. The term "wander" refers to frequency variability occurring at a rate below about 10 Hz. However, the terms are typically used somewhat interchangeably.

Latency Compensation

Latency compensation may be performed to reduce the fractional sample delay of a device with respect to a reference clock. The device that generates the reference clock is referred to herein as the Clock Master. In an embodiment, the delay between the transmission and round trip return of a packet sent from the Clock Master to a device being calibrated may be determined in order to determine the amount of network latency between the Clock Master and the device. The Clock Master may divide this round trip delay in half to account for the bidirectional nature of the packet transmission. This delay may be used to calibrate the sample clock at the device in order to coordinate the device sample clock with the reference clock.

In an embodiment, the measured delay between the clock Master and each device may be fixed. As such the delay calculation may only be performed at one of three times for a network having fixed delays: 1) during network initialization, 2) when a new Clock Master is selected, and 3) when one or more devices are added to the network between the Clock Master and a device. Recalibration may not be performed for a first device if one or more devices are added to the network, at a point that is not between the Clock Master and the first device.

In an embodiment, the measured delay between the Clock Master and a device may be determined a plurality of times and averaged to determine an average delay. The average delay may attempt to account for transmission jitter between the Clock Master and the device being calibrated.

FIGS. 1A-D depict exemplary network state diagrams for a process for compensating for latency between devices according to an embodiment. As depict in FIG. 1A, a Clock Master 105 may be connected to a Digital I/O (DIO) device 110 (i.e., a non-merger device) to be calibrated via a bidirectional data bus. The Clock Master 105 may supply a reference clock to the DIO device 110 and other devices in the network (not shown). The Clock Master 105 may measure the delay between the time that data is transmitted via its transmit port and the time that the same data is received via its receive port via the DIO device 110. The delay may include several delays, such as $D_{C1}$, $D_{C1}'$ and $PTD_{DIO}$. Each of $D_{C1}$ and $D_{C1}'$ may include three separate delays; the delay from the time that data is transmitted by a transmit port to the time that the data is transmitted by a physical interface output, the delay over a cable connecting the Clock Master 105 and the DIO device 110, and the delay from the time that data is received by the physical interface input to the time that the receive data is recognized as valid. $PTD_{DIO}$ (pass-through delay) may be the delay through the DIO device 110 from the time that the receive data is recognized as valid to the time that the data is re-transmitted.

Figure 1A:
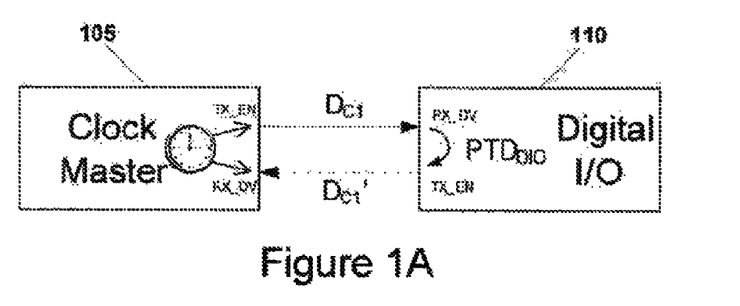
FIGS. 1A-D depict exemplary network state diagrams for a process for compensating for latency between devices according to an embodiment.

As shown in FIG. 1A, the outbound and inbound paths from the Clock Master 105 may be statistically matched if the Clock Master's transmit and receive delay match the DIO device's 110 transmit and receive delay, respectively. However, if the delays do not match, the amount with which they are mismatched may be determined. Each device 105, 110 may store information pertaining to its transmit and receive physical interface delays. The Clock Master 105 may transmit the round trip delay ($RTD_{CM}$) its transmit physical interface delay ($TXD_{CM}$) and its receive physical interface delay ($RXD_{CM}$) to the DIO device 110. The DIO device 110 may then use these values, its transmit physical interface delay ($TXD_{DIO}$), its receive physical interface delay ($RXD_{DIO}$) and the $PTD_{DIO}$ to calculate $D_{C1}$ using the following equation:

$$D_{C1} = \frac{RTD_{CM} - PTD_{DIO} + TXD_{CM} - TXD_{DIO} + RXD_{DIO} - RXD_{CM}}{2}, \quad (1)$$

where computing $TXD_{CM}-TXD_{DIO}+RXD_{DIO}-RXD_{CM}$ may account for the potentially mismatched transmit and receive physical interface delays.

Figure 1B:
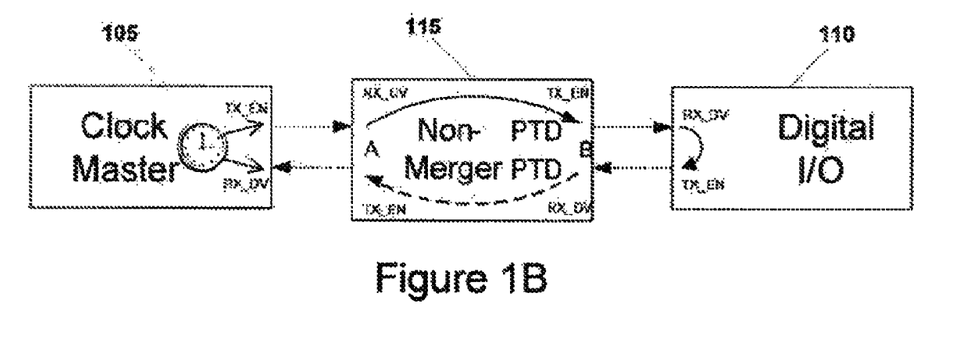

FIG. 1B depicts the case where at least one serial network device 115 is located between the Clock Master 105 and the DIO device 110. In this case, the additional delay added by the serial network device 115 when moving towards the DIO device 110 may be statistically the same as the additional delay added by the serial network, device when moving towards the Clock Master 105. In other words, the pass-through delays may be matched. As such, equation (1) may be used to determine the delay for a DIO device 110 in this case as well.

Figure 1C:
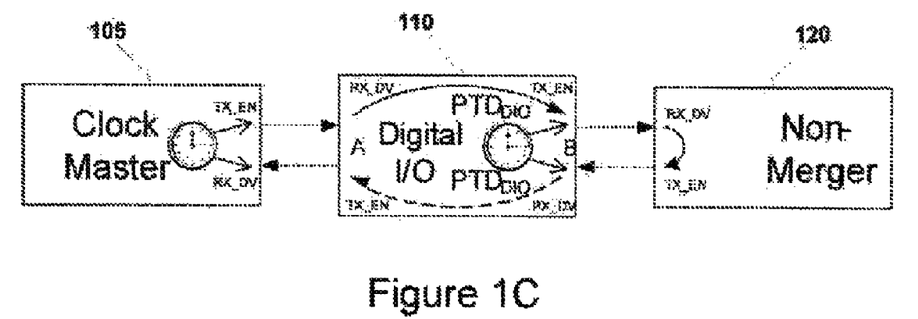

FIG. 1C depicts the case where the DIO device 110 is located between the Clock Master 105 and at least one network device 120. In this case, the DIO device 110 may measure the round trip delay on its port connected to the at least one network device 120. Although that delay may comprise numerous delays, it may be treated as a single delay ($RTD_{DIO}$) by the DIO device 110 for computation purposes. The final delay ($D_{CM\to DIO}$) may be computed using the following equation:

$$D_{CM \to DIO} = \frac{RTD_{CM} - RTD_{DIO} - 2*PTD_{DIO} + TXD_{CM} - TXD_{DIO} + RXD_{DIO} - RXD_{CM}}{2}. \quad (2)$$

Figure 1D:
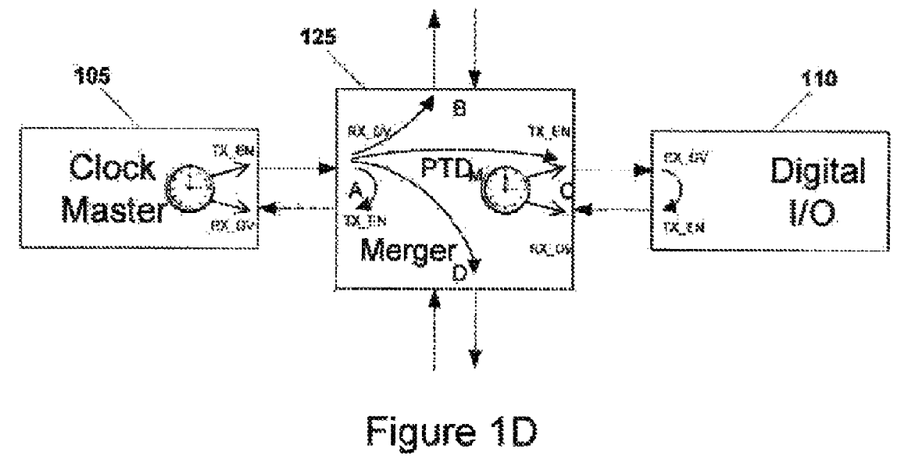

FIG. 1D depicts the case where a non-serial network device 125 is located between the Clock Master 105 and the DIO device 110. A non-serial network device 125 (a merger device) may include more than two ports. In an embodiment, the merger device 125 may create an asymmetrical round-trip delay. When the merger device 125 receives a data packet from the Clock Master 105, the packet may be transmitted out all other ports with the same pass-through delay ($PTD_M$) for each port. However, the pass-through delay when receiving a data packet from the DIO device 110 may differ depending upon the port of the merger device 125 to which the DIO device is connected. In an embodiment, the merger device 125 may also re-transmit the data packet via the port connected to the Clock Master 105. As such the merger device 125 may appear to be the end of a serial run to the Clock Master 105. As such, the Clock Master 105 may send its $RTD_{CM}$, $RXD_{CM}$ and $TXD_{CM}$ data based on the path from the Clock Master 105 to the merger device 125. In this case, the merger device 125 may be required to determine its own round-trip port delay measurement on the port connected to the DIO device 110. The delay for this configuration may be determined using the following equation:

$$D_{CM \to DIO} = \frac{RTD_{CM} - PTD_M + TXD_{CM} - TXD_M + RXD_M - RXD_{CM}}{2} + \frac{RTD_M - PTD_{DIO} + TXD_M - TXD_{DIO} + RXD_{DIO} - RXD_M}{2} + PTD_M, \quad (3)$$

where all terms with the M subscript are merger device 125 delays. Equation (3) may merely comprise two instances of equation (1) added together (the first instance corresponds to the delay from the Clock Master 105 to the merger device 125 and the second instance corresponds to the delay from the merger device to the DIO device 110) plus the pass-through delay ($PTD_M$) for the outbound internal merger device delay between the two ports.

In an embodiment, additional delays may be present in the Clock Master 105, such as a delay between the Clock Master's reference clock and the time when the data packet is transmitted by the transmit port. This Clock Master 105 may supply this delay to the DIO device 110 for its determination.

Figure 2:
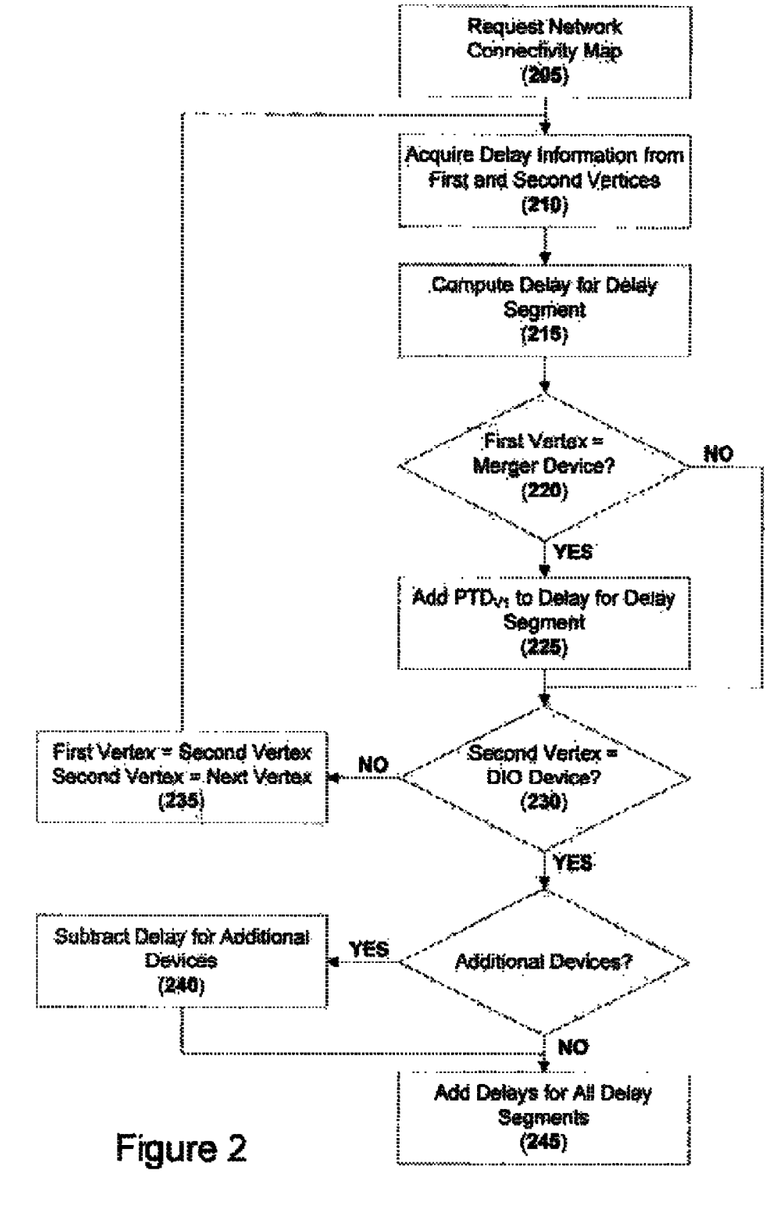
FIG. 2 depicts a flow diagram of an exemplary method of determining the latency between a Clock Master and A DIO device according to an embodiment.

FIG. 2 depicts a flow diagram of an exemplary method of determining the latency between a Clock Master and a DIO device according to an embodiment. As depicted in FIG. 2, the DIO device 110 may request 205 a network connectivity map. The network connectivity map may enable the DIO device 110 to determine the locations of the Clock Master 105, the DIO device 110 and any merger devices 125 located between the Clock Master and the DIO device (collectively, the Vertices). The DIO device 110 may acquire 210 delay information from the first Vertex and the second Vertex. The delay information may be used to compute 215 the delay from the first Vertex to the second Vertex (a Delay Segment). For the first Delay Segment, the first Vertex may be the Clock Master 105.

The delay for each Delay Segment may be computed using the following equation:

$$D = \frac{RTD_{V1} - PTD_{V2} + TXD_{V1} - TXD_{V2} + RXD_{V2} - RXD_{V1}}{2},$$

where the values having the subscript V1 may pertain to the Clock Master 105 or a Vertex closer to the Clock Master and the values having the subscript V2 may pertain to the DIO device 110 or a Vertex closer to the DIO device. The DIO device 110 may then determine 220 whether the first Vertex is a merger device. If the first Vertex is a merger device 125. $PTD_{V1}$ may be added 225 to D. The DIO device 110 may then determine 230 if the second Vertex is the DIO device and if the DIO device is attached to additional devices on a port not attached to the Clock Master 105. If the second Vertex is not the DIO device 110, the Vertices may be updated 235, and the delay for the next Delay Segment may be determined. If the second Vertex is the DIO device 110 and the DIO device is attached to additional devices on a port not facing the Clock Master 105.

$$\frac{RTD_{DIO} + PTD_{DIO}}{2}$$

may be subtracted 240 from D. The delays for all delay segments may then be summed 245.

In an embodiment, an RTD value ($RTD_{V1}$, $RTD_{V2}$, $RTD_{DIO}$, etc.) may be computed as an average of measurements over a plurality of cycles in order to account for low frequency jitter and wander accumulation in a network. In an embodiment, a moving average may be computed by determining a most recent RTD value, weighting the value, and adding it to a previously computed average RTD value. In an embodiment, the previously computed average RTD value may also be weighted. Alternately, the updated average RTD value may be scaled. For example, the most recent RTD value may account for $\frac{1}{64}^{th}$ of the value and the previously computed average RTD value may account for the remainder. The value may be updated at the packet rate, every N packets, or at a fixed time, such as every 1 ms. Other weights and update periods may be used within the scope of this disclosure as will be apparent to one of ordinary skill in the art.

If the sample rate changes (such as switching from 44.1 kHz to 48 kHz) and/or the sample rate moves over time, an adjustment of the calculated latency compensation in each DIO device may be required. The recalculation of the latency compensation may be caused by delay in the transmission and retransmission of packets throughout the network. Because the amount of delay may differ for each device, the adjustment may differ as well.

In an embodiment, the Clock Master may be responsible for aligning the nodes in a networking system. In an embodiment, the Clock Master may write a Clock Master Packet Length (CMPL) denoting a reference time for the length of packets generated by the Clock Master in each outgoing data packet. In an embodiment, the CMPL may be a binary coded positive number with a fractional part. For example, the CMPL may be an 11-bit integer with a 4-bit fraction representing a number from 0 to 2047.9375. Other devices may use this fractional clock measurement to align their clocks with the Clock Master. However, no device may be required to enter into lock step with the Clock Master's TX clock.

Figure 3A:
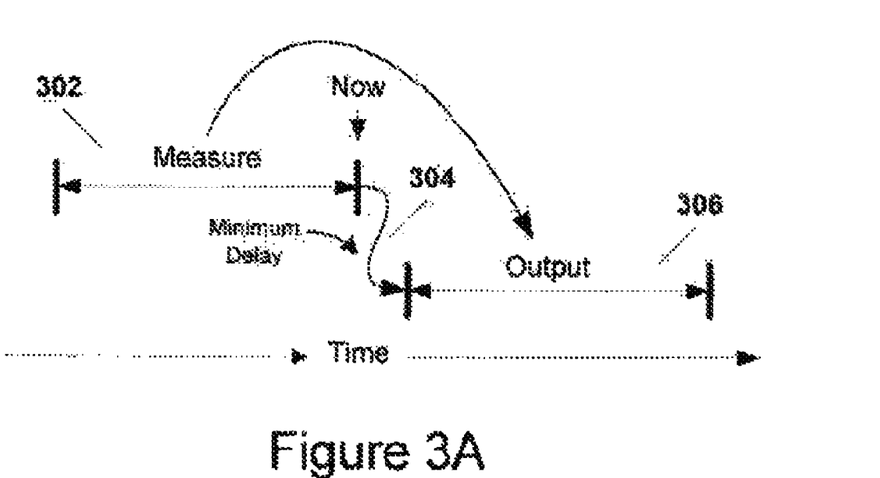
FIG. 3A depicts a time flow diagram for packet transmission according to an embodiment.
Figure 3B:
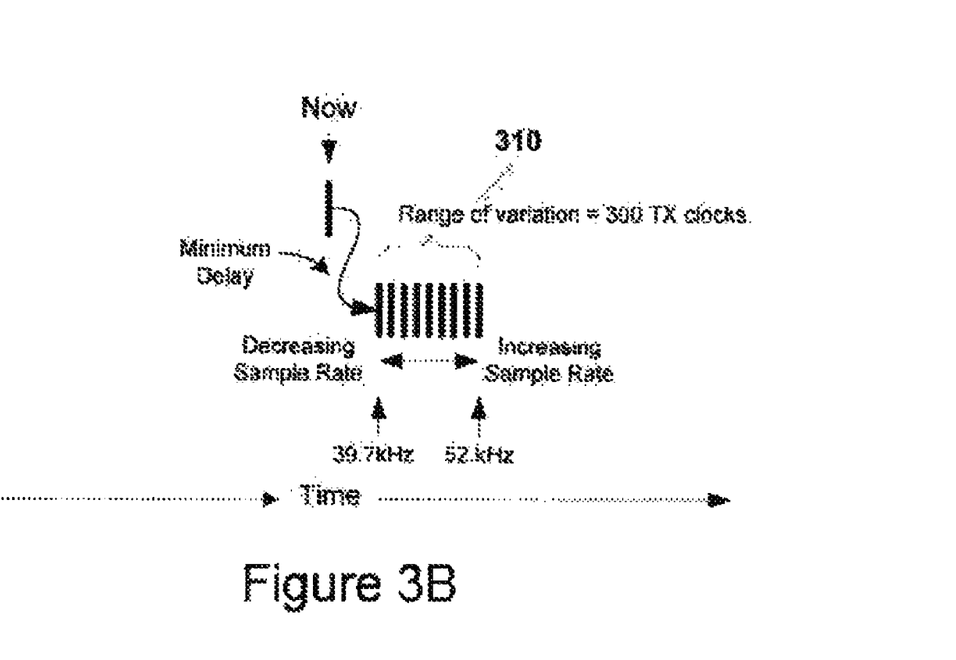
FIG. 3B depicts a time flow diagram for the relationship between a reference clock and packet transmission according to an embodiment.

In an embodiment where a packet is delayed prior to transmission and an external reference clock is used, the timing relationship between the reference clock and the start of a transmitted packet may change over time. Such an embodiment is depicted in FIGS. 3A and 3B. FIG. 3A depicts a time flow diagram for packet transmission according to an embodiment. As shown in FIG. 3A, the number of clock cycles 302 required to receive or generate a packet may be determined. A delay 304 may then occur in order to determine packet length information and/or perform other processing. The packet 306 may then be transmitted. As such, the measured clock source may be delayed by slightly more than one packet. In various embodiments, the CMPL may appear within the packet before that packet transmission is complete. By including the current CMPL within the packet that it represents rather than the next packet transmitted, the system responsiveness to moving sample rates may be improved. In an embodiment, the delay 304 may be computed based on, for example, the length of the transmitted packet 306 and the sample rate. A minimum value for the delay 304 may be required to ensure that any information to be inserted into the packet is inserted properly.

FIG. 3B depicts a time flow diagram for the relationship between a reference clock and packet transmission according to an embodiment. As shown in FIG. 3B, if the sample rate changes, the timing relationship between the external reference clock and the start of the transmitted packet may shift within a range 310. The delay period may be directly related to the packet length (i.e., the sample rate). For example, if the sample rate changes from 44.1 kHz to 48 kHz, the packet length in a system with a 25 MHz clock may change from 1134 to 1042 clocks. Accordingly, the transmitted packet start location may move 92 clocks later in the exemplary system, relative to the reference clock, as the sample rate increases from 44.1 kHz to 48 kHz.

Figure 4A:
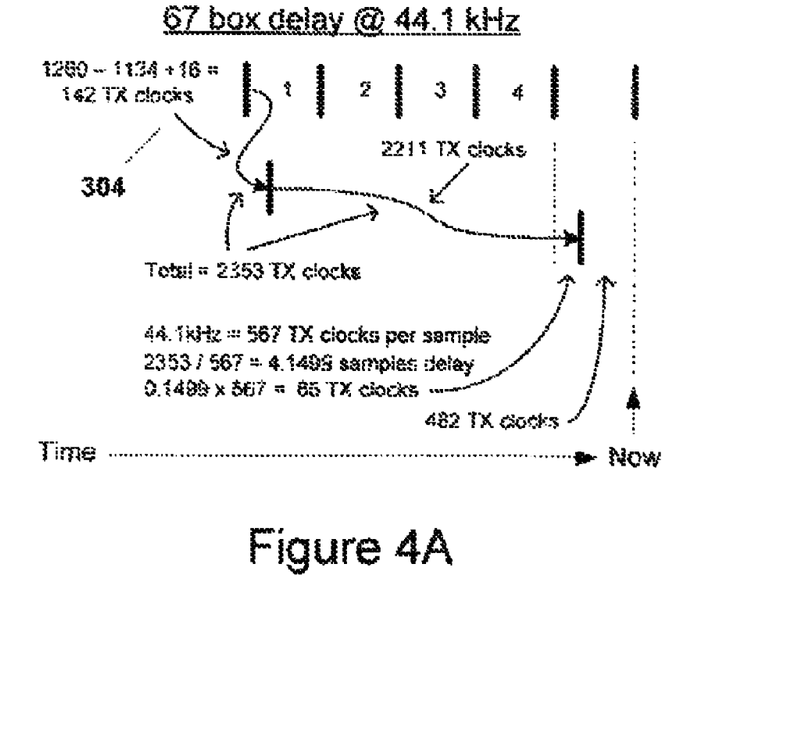
FIGS. 4A and 4B depict time flow diagrams for exemplary latency compensation determinations according to embodiments.
Figure 4B:
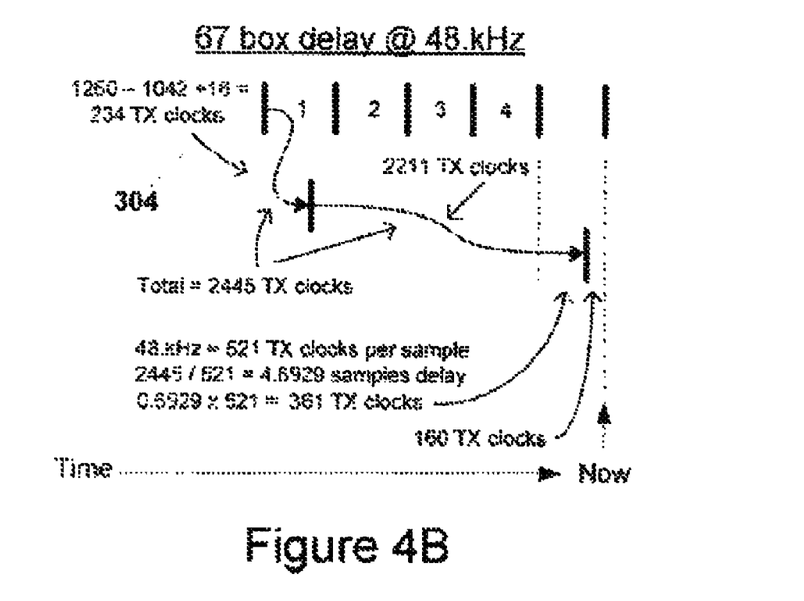

FIGS. 4A and 4B depict time flow diagrams for exemplary latency compensation determinations according to embodiments. As shown in FIG. 4A, the initial delay (CMO) 304 may be determined using the following formula:

CMO=Max Clocks−Clocks(Sample Rate)+Offset. The Offset may be a constant number of cycles that ensures that, for example, packet length information may be inserted into the packet. In an embodiment, the maximum number of clocks for a packet may equal 1260, the number of clocks in a packet generated by the Clock Master (determined by rounding the CMPL) may equal 1134 at 44.1 kHz and the offset (CMD) may equal 16. In this embodiment the CMO is equal to 142.

The latency compensation at devices other than the packet source may be based on this initial delay and the network latency in reaching the device. For example, the 67$^{th}$ device in a daisy-chain network that has, for example, 1.34 μs of delay through each device may have an additional (67−1) * 1.34 μs=88.44 μs of delay. For a 25 MHz clock, the additional delay equals 2211 clocks of delay. As such, the total delay equals 2353 clocks. At a 44.1 kHz sample rate, each sample period equals 567 clocks. Accordingly, to compensate for the latency at the 67$^{th}$ device at 44.1 kHz, the local audio clocks for the device would have to be shifted 85 clocks earlier or 482 clocks later than when the packet is received.

FIG. 4B depicts the same calculation for a 48 kHz sample rate. Here, the initial delay may be computed to be: CMO=1260−1042+16=234 clocks. Thus, the total delay equals 2445 clocks. At a 48 kHz sample rate, each sample period equals 521 clocks. Accordingly, to compensate for the latency at the 67$^{th}$ device at 48 kHz, the local audio clocks for the device would have to be shifted 361 clocks earlier or 160 clocks later than when the packet is received. Thus, a change in sample rate from 44.1 kHz to 48 kHz may require a 276 clock shift earlier or a 322 clock shift later at the 67$^{th}$ device.

Once the $D_{CM->DIO}$ value has been computed (using equation (2) above), a device may determine whether the local clocks are shifted to align with an earlier or later sample. In an embodiment, this decision may be performed by computing the number of samples per delay (SPD) using the following equation: SPD=ROUND((2* ($D_{CM->DIO}$+CMO))/CMPL). Next, the latency compensation for the device may be determined based on the current value of the CMPL. In the embodiments described above, the latency compensation may be determined by the following equation LC= ($D_{CM->DIO}$+CMO))−((CMPL *SPD)/2).

The above-described example is merely exemplary of the operation of latency compensation for a specific frequency modification (i.e., from 44.1 kHz to 4 kHz), which is not limited to the specified frequencies. One of ordinary skill in the art will recognize that adjustments between differing frequencies may be performed using the teachings of the above disclosure. Moreover, adjustments may be made for frequency shifts having a substantially smaller magnitude, such as if the frequency of an oscillator changes over time within its specified range.

Figure 5:
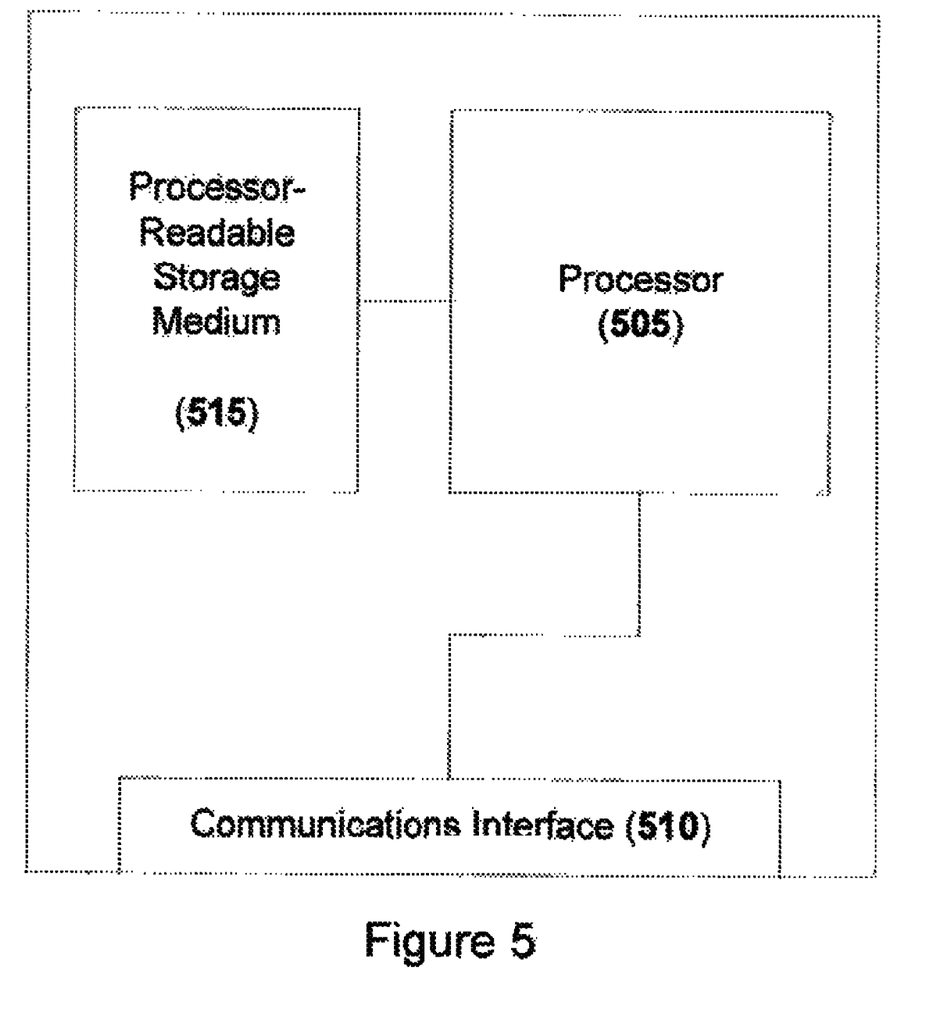
FIG. 5 depicts a block-level diagram for an exemplary system that performs latency compensation according to an embodiment.

FIG. 5 depicts a block-level diagram for an exemplary system that performs latency compensation according to an embodiment. As shown in FIG. 5, the system may include a processor 505, a communications interface 510 and a processor-readable storage medium 515. The communications interface 510 may be in communication with the processor 505 and with the Clock Master (not shown) via zero, one or more other devices. The processor-readable storage medium 515 may be in communication with the processor 505 and may contain one or more programming instructions for aligning the local sample clock to the reference sample clock at the Clock Master. The programming instructions may be used to perform the methods substantially as described above in reference to FIGS. 1A-D, 2, 3A-B and 4A-B.

Retransmission Jitter Management

The sample rate in an audio network may be communicated by means of the packet rate. For example, the sample rate may be a power of 2 times faster than the packet rate. However, the sample rate and the packet rate may be asynchronous to any local clock used to transmit packets. At the Clock Master, asynchronous re-clocking of a sample rate clock may create, for example, 40 ns of jitter in the transmitted packets if the local clock operates at 25 MHz. Because each network device's transmit clock ("TX clock") is asynchronous to every other network device'TX clock, each serially connected device may add an additional 40 ns of packet jitter. In other words, jitter may accumulate from device to device. If jitter accumulation in a network is not addressed, such accumulation may either impede retransmission within the network or negatively affect the quality of real time audio or video data carried within the network.

When managing jitter, it is important that each clock cycle is accounted for. All calculations and any rounding thereof, must be implemented so that, within a device, each clock cycle, or fraction of a clock cycle, is accounted for. Though the number of clock cycles per packet may vary from device to device, no time may be lost as the packets traverse the asynchronous network. In other words, every network device, on average may equalize the quantity of its input and output clock cycles. Performing the calculations in this manner may prevent input to output drift and network drift.

A Clock Master device may initiate a sample rate clock signal. If the Clock Master operates at 25 MHz, the Clock Master's clock may have 40 ns of jitter and may provide the cleanest clock signal for transmitting the sample rate to another device in the net work. In a network in which device TX clocks are asynchronous to each other, the original Clock Master clock cannot be retransmitted by subsequent devices. As such a device connected to the Clock Master may add an additional 40 ns of jitter to the 40 ns of jitter received from the Clock Master and transmit 80 ns of jitter. Typically, this jitter would accumulate from device to device in a daisy chain network, such that the third device would have 120 ns of jitter, the fourth would have 160 ns, and so on. The jitter management process described below may seek to limit this jitter accumulation.

The process may attempt to mimic the re-clock of the Clock Master's TX clock at the second device in the chain at subsequent devices. The following observations may be made regarding the second device: 1) the second device periodically adds or removes a clock cycle from the packet length depending on the frequency relationship between the Clock Master's TX clock and the second device TX clock; 2) the jitter from the second device is a combination of two 40 ns jitter patterns. The first jitter pat tern may be caused by the interaction between the Clock Master's TX clock and the sample rate clock. The second jitter pattern may be caused by the interaction between the two TX clocks.

Accordingly, if a third device could retransmit the Clock Master's packet jitter pattern but add or remove clock cycles at a periodic rate determined by the difference between the third device's TX clock and the Clock Master's TX clock, the device would perform the same operation as the second device described above.

Figure 6:
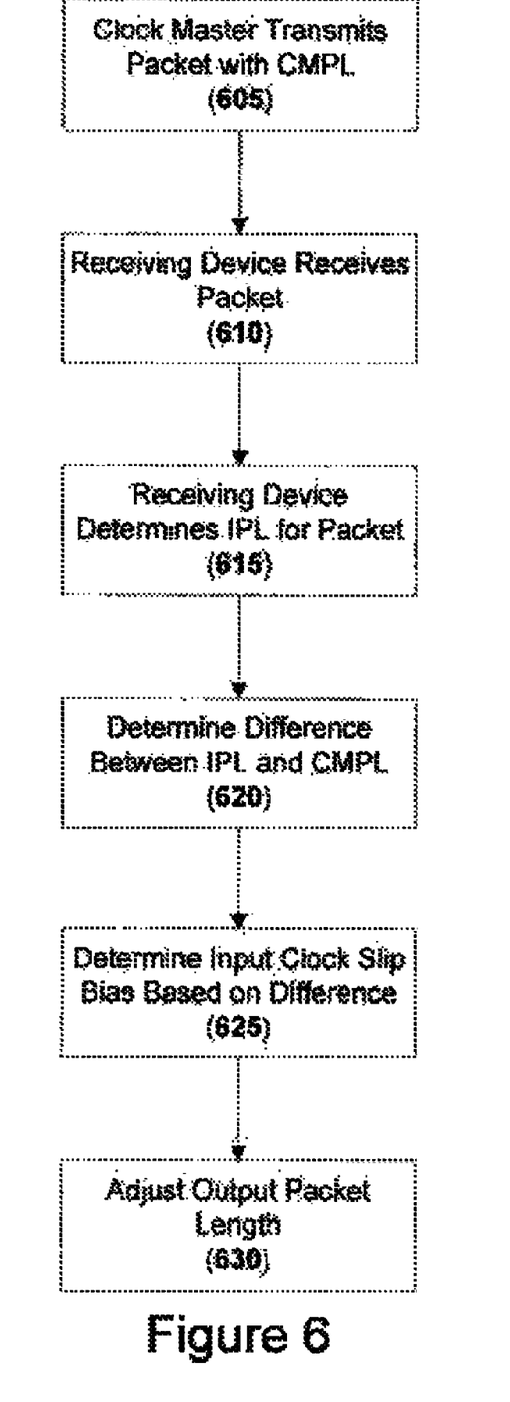
FIG. 6 depicts an exemplary method of limiting jitter in a device according to an embodiment.

FIG. 6 depicts an exemplary method of limiting the jitter in a device according to an embodiment. As shown in FIG. 6, the Clock Master may transmit 605 the Clock Master Packet Length (CMPL) within a packet. In an embodiment, the CMPL may be transmitted 605 as part of the corresponding packet. Transmitting 605 the CMPL with the corresponding packet may minimize the amount of processing a receiving device is required to perform prior to forwarding the packet in order to limit jitter. In an embodiment, the CMPL may be inserted into the packet during the CMO delay period 304 described above in reference to FIG. 3A prior to packet transmission 605 from the Clock Master.

The CMPL may be quantized to the Clock Master's TX clock rate and used to generate a transmitted packet length. As such, in addition to the fractional CMPL, the Clock Master may determine the actual TX clock packet length that it transmits. This packet length may either be the number represented by the eleven bit integer portion of the fractional CMPL or that number plus one. In an embodiment, a sixteenth bit (the other 15 bits comprise the 11 integer bits and 4 fraction bits) may be used to determine whether the transmitted length is one greater than the integer portion of the CMPL. In an embodiment, computing the transmitted packet length in devices other than the Clock Master may be performed using the following equation: CMPL_RND=CMPL[15]+ CMPL[14:4], where CMPL[15] represents the carry bit and CMPL[14:4] represents the 11-bit integer portion of the CMPL.

A receiving device may receive 610 the packet and determine 615 the incoming packet length (IPL) for the received packet. The difference between the IPL and the CMPL may then be determined 620. Although merely inserting the CMPL may not provide an accurate approximation of the original jitter received by a second device, the difference between the IPL and the CMPL, may represent the total difference between the clock Master's TX clock and the receiving device's TX clock. This result may occur even if the difference between the CMPL and the IPL results at least in part, from re-clocking by other devices located between the Clock Master and the receiving device. By determining 620 the difference between the IPL and the CMPL, evenly distributing this difference over time, and applying the difference to the retransmission of the CMPL jitter pattern, the output of the receiving device may approximate that of the second device.

The difference between the IPL, and the CMPL may be used to determine 625 an input clock slip bias (ICSB). For example, the difference may be passed through a low pass filter (the ICSB filter) that generates an average value representing the pulse density of the incoming clock slips.

The packet length of an outgoing packet, which is counted based on the second device TX clock, may be adjusted 630 based on the ICSB. For example, if clock slips occur 50% of the time (on average), the ICSB filter may output a value of ½. As such, the second device may adjust the incoming packet length of every other incoming packet by 1 to provide the outgoing packet length for an outgoing packet. If the outgoing packets are adjusted 630 from the CMPL jitter pattern, at the averaged input slip rate, the desired 80 ns jitter pattern may be observed on the output. As such, if the averaged input slip rate was ¼, the CMPL jitter pattern may be adjusted 630 once every four packets. Although incoming clock slips do not necessarily occur periodically, the outgoing packet length provided by the second device may be adjusted 630 from the value of the incoming packet length periodically without loss of information because such adjustments may merely add or remove data containing a pad value from a packet. Accordingly, the substantive data in each packet may not be affected. The above-described technique is referred to herein as clock slip averaging.

In an embodiment, both positive and negative adjustments may occur because the incoming jitter pattern may include, for example, a plurality of sources. In an embodiment, three jitter sources may be present; the Clock Master, the previous device and re-clocking at the receiving device. As such, clock slip averaging may result in adjustments of either polarity.

In an embodiment, an accumulator may be incremented by the average input value once for each outgoing packet. When the accumulator contains a value that is greater than or equal to +1, the OPL may be set equal to CMPL_RND+1, and the accumulator value may be decremented by 1. Conversely, when the accumulator contains a value that is less than or equal to −1, the OPL may be set equal to CMPL_RND−1, and the accumulate or value may be incremented by 1. Otherwise, the OPL may be set equal to CMPL_RND.

Low pass filtering the difference between the IPL and the CMPL may have the additional advantage of making the entire network more responsive to a moving sample rate. For example, if the CMPL were not included in transmitted packets and limiting the retransmission jitter depended on low pass filtering only the IPL, not only would the wander be worse, but also the network may suffer from a considerable amount of lag.

In an embodiment, the cutoff frequency of the ICSB filter may be set low enough to filter out any beat patterns between the various TX clocks, but high enough to minimize the effects of a moving sample rate. The frequency difference between two TX clocks may be the rate at which clock slips occur. As such, if the TX clock frequency difference is 100 Hz, and the packet rate is 24 kHz, a clock slip may occur every 240 packets. However, if the filter cutoff is set too low, the entire network may be somewhat unstable because the filter may respond too slowly when tracking small frequency modifications. In an embodiment, a filter cutoff frequency of 65 Hz may be used for a 48 kHz sample rate. In an embodiment, the cutoff frequency may be defined as a percentage of the sample rate. As such, the cutoff frequency may fluctuate as the sample rate fluctuates.

If the difference in the frequencies for TX clocks of two devices is below the ICSB filter cutoff frequency, beat frequencies may be produced between the devices in certain cases. This may cause low frequency jitter and wander in the network. In order to ensure that heat frequencies do not occur, the operating frequency for adjoining devices may be required to differ by at least a minimum frequency. In addition, the clock master a TX clock may be required to differ from each other device's TX clock by at least a minimum frequency.

Accordingly, in an embodiment, network devices may each include, for example, two or three oscillators. The first oscillator may only be present in devices that can be the Clock Master. The second oscillator may be assigned to a slightly lower frequency than the first oscillator, and the third oscillator may be assigned to a slightly higher frequency than the second oscillator. For example, the first oscillator may have a frequency of 25.00000 MHz, the second oscillator may have a frequency of 24.99825 MHz and the third oscillator may have a frequency of 25.00175 MHz. The first oscillator may optionally be excluded from devices that, for example, are not intended to be a Clock Master under any circumstances. Each oscillator may have a +/−30 ppm rating over all sources of error (temperature, aging, etc.). Accordingly, even with maximum error, the frequency ranges for the oscillators may be non-overlapping. It will be apparent to those of ordinary skill in the art that different oscillator frequencies, ratings and the like may be used within the scope of this disclosure.

In a network, devices may be configured such that the Clock Master is assigned to the first oscillator frequency. Other devices may be configured at one of the other two frequencies in an alternating fashion throughout the network such that no two adjoining devices use the same TX clock frequency range.

In a network, both low frequency jitter and wander may accumulate as packets are transmitted serially from device to device. Such accumulator may be caused by, for example, and without limitation oscillator noise and PLL filter peaking in a typical network. In such networks, the data transmission clock is recovered with a PLL, and the recovered clock is used to retransmit the data. In a serially connected real time audio network, it may be more critical to keep the packet rate free of jitter and wander accumulation because all TX clocks are asynchronous. Although oscillator noise may contribute to low frequency jitter and wander accumulation, the re-quantizing of the packet arrival time by each device's clock may be a primary cause of low frequency jitter and wander accumulation.

While the filtering and control of the oscillator frequencies described above may force jitter to occur at frequencies that are easily filtered out by a low pass filter, low level, low frequency noise in the PLL of each device's physical interface device may remain. This low frequency noise may accumulate as packets move serially from device to device. As such, low frequency jitter and wander may exist in a serially connected network regardless of the frequency at which the low pass filter operates. For example, in an embodiment having a 25 MHz clock and 67 serially connected devices, approximately 80 ns of low frequency jitter and wander may accumulate in addition to the above-described 80 ns of jitter and wander for a total of 160 ns of low frequency jitter and wander.

The fractional CMPL may be transmitted to every device in order to provide a packet length measurement that has much lower jitter than the IPL for the device. By over-sampling by 16 times, the CMPL may result in $\frac{1}{16}^{th}$ the jitter of the local IPL.

The fractional CMPL may be based on the Clock Master's TX clock. However, because the ICSB represents the difference between the local TX clock and Clock Master's TX clock, adding ICSB to the CMPL may correct for this difference.

In an embodiment, the ICSB filter may substantially be determined by the following equation:

$$ICSB_n = \frac{IPL_n - CMPL\_RND_n}{64} + \frac{63}{64} * ICSB_{n-1}.$$

In an embodiment, the output packet length (OPL) of every device may only be permitted to deviate from the CMPL_RND value by +/−1 per packet. This provide an additional safeguard against jitter accumulation.

It will be apparent to those of ordinary skill in the art that more or fewer numbers of bits may be required to represent one or more of CMPL, and CMPL_RND depending upon the maximum packet length for the system in which they are used. Such differences are encompassed within the scope of this disclosure.

While the jitter management process described above can be used with any type of network, it is particularly effective in networks where devices are daisy chained (serially connected) together and the clocks for each device are asynchronous. In a network in which every device is connected to a common clock source, jitter management may not be required because each device will have a maximum jitter of two clocks (one clock of jitter for the clock source's sample clock and one clock of jitter for the receiving device's clock). However, in a daisy chain network that does not manage jitter, one clock of jitter would be added at each device. In other words, for a chain of N devices between it and the clock source in a daisy chain configuration, the device would have N clocks worth of jitter if jitter were not managed.

Figure 7:
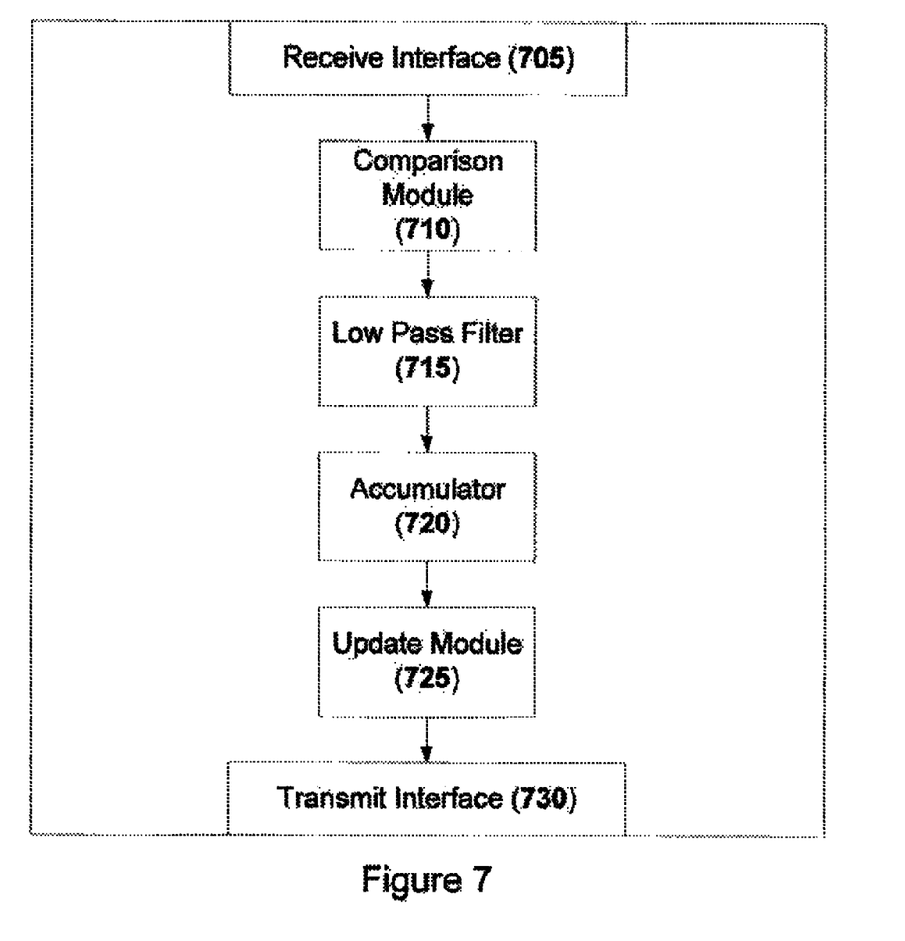
FIG. 7 depicts a block-level diagram for an exemplary system that performs jitter management according to an embodiment.

FIG. 7 depicts a block-level diagram for an exemplary system that performs latency compensation according to an embodiment. As shown in FIG. 7, the system may include a receive interface 705, a comparison module 710, a low pass filter 715, an accumulator 720, an update module 725 and a transmit interface 730. The receive interface 705 may receive packets from an external device. The packets may include, without limitation, a CMPL value. IN an embodiment, the CMPL value may be a fractional value. An IPL value may be determined based on the number of clock cycles required to receive a packet via the receive interface 705. The comparison module 710 may calculate a difference between the IPL value and the CMPL value. This difference may be forwarded to the low pass filter 715 that filters the difference based on the accumulation of low frequency jitter and wander. The filtered difference value may then be added to an accumulator value that is stored in the accumulator 720 to produce an updated accumulator value. An update module 725 may evaluate the updated accumulator value to determine the outgoing packet length for the packet when it is transmitted from the transmit interface 730. For example, if the updated accumulator value is greater than or equal to 1, the packet length in the outgoing packet may be set to the rounded CMPL value (i.e., CMPL[15]+CMPL[14:4])+1. If the updated accumulator value is less than or equal to −1, the packet length in the outgoing packet may be set to the rounded CMPL value −1. If the update accumulator value is between −1 and 1, the packet length in the outgoing packet may be set to the rounded value of the CMPL. It will be apparent to those of ordinary skill in the art that alternate methods of determining the packet length for the outgoing packet and alternate systems for reducing packet jitter may be performed, and such methods are intended to be encompassed within the scope of the present disclosure.

Local Jitter Management

Figure 8:
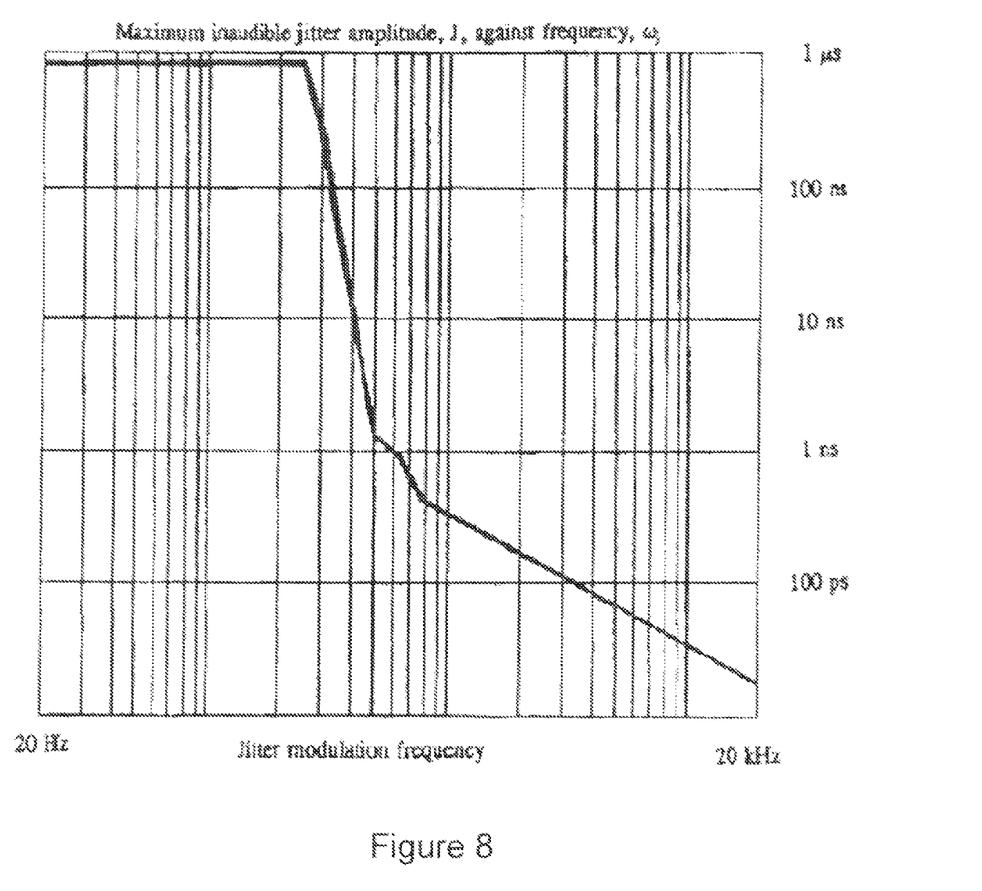
FIG. 8 depicts a graph of the human ear's sensitivity to jitter in an audio signal.

Local jitter management may be used to filter out jitter from received packets while remaining agile enough to deal with moving sample rates. FIG. 8 depicts the human ear's sensitivity to jitter, which rolls off at lower frequencies. As shown in FIG. 8, the slope between 250 Hz and 600 Hz is very steep, over 200 dB per decade. Above 600 Hz, the slope decreases to 20 dB per decade. A single pole filter may be used to filter jitter above 600 Hz. To allow tracking of moving sample rates, the −3 dB point of a low pass filter may be set at about 100 Hz. Based on the retransmission jitter limit described above (approximately 120 ns), the filter may start to attenuate the jitter at 100 Hz, reaching 45 dB of attenuation by 600 Hz. A three to five pole filter may be used to perform this operation.

An exemplary five pole filter is described herein. In an embodiment, each filter output value is represented by a 48 bit number including 1 sign bit, 11 integer bits and 36 fractional bits. Each filter output value is alternately rounded to 36 bits including 1 sign bit, 11 integer bits and 24 fractional bits before being passed to the next filter. Alternate rounding is described in additional detail below. The filter output values (F1-F5) may be defined by the following equations.

$$F1_n = \frac{CMPI_n + ICSB_n}{128} + \frac{127}{128} * F1_{n-1}$$

$$F2_n = \frac{F1_n}{32} + \frac{31}{32} * F2_{n-1}$$

$$F3_n = \frac{F2_n}{32} + \frac{31}{32} * F3_{n-1}$$

$$F4_n = \frac{F3_n}{16} + \frac{15}{16} * F4_{n-1}$$

$$F5_n = \frac{F4_n}{2^{F5\_FC_{n-1}}} + \frac{2^{F5\_FC_{n-1}} - 1}{2^{F5\_FC_{n-1}}} * F5_{n-1} + \frac{CFE\_LF_{n-1}}{1024} + \frac{CFR\_BF_{n-1}}{16},$$

where: $F5\_FC_n = \begin{cases} 0, & |CFE_n| < 1 \\ \lfloor |CFE_n| \rfloor, & 1 \leq |CFE_n| < 5, \\ 4, & |CFE| \geq 5 \end{cases}$ $CFE_n = CMPL_n + ICSB_n - F5_n + CFE_{n-1}$ $CFE\_LF_n = \frac{CFE_n}{32} + \frac{31}{32} * CFE\_LF_{n-1}$, $CFE\_BF_n = CFE\_PBFB_n - CFE\_PBFB_{n-1}$, $CFE\_PBFB_n = \frac{CFE\_PBFA_n}{32} + \frac{31}{32} * CFE\_PBFB_{n-1}$, $CFE\_PBFA_n = \frac{CFE_n}{32} + \frac{31}{32} * CFE\_PBFA_{n-1}$ One of ordinary skill in the art will recognize that the above equations are merely exemplary. Additional or fewer filters, alternate weighting facts, and/or variables having different bit widths may be used within the scope of the present disclosure.

The retransmission jitter algorithm described above may attenuate at least 16 dB at 600 Hz, by adding the ICSB to the CMPL. This signal is the starting point for the local jitter management algorithm.

In an embodiment, two sources of jitter may be filtered. The first source may result from re-clocking the TX clock (normal packet jitter). The second source may result from jitter in the original Clock Master source. The difference between these two sources may be that any jitter in the Clock Master's source is recorded in the CMPL, but packet jitter is not. As a result, the 16 dB of jitter attenuation described above may not apply to clock source jitter. Both sources may be reduced by the local jitter filter.

Clock source jitter may be smaller in amplitude than packet jitter. As such, extra filtering may not be required. Using a five pole filter, a clock source with 200 ns of 600 Hz jitter may still be reduced to 1 ns of jitter.

An error signal may be generated from the difference between the input delay and the output delay to prevent the output signal from becoming offset in time relative to the input signal. The error signal may be fed back based on, for example, a proportional-integral-differential (PID) servo loop. In a typical PID servo loop, the error feedback may be separately controllable through a low pass filter (integral), band pass filter (proportional), and high pass filter (differential). Because high frequency jitter is being filtered out, only a PI servo loop may be used. The low pass filtered error may be the primary source of feedback for the filter. The band pass filtered error may merely be used to control ringing caused by the low pass filtered feedback.

As a result of the above filter value calculations, a number representing the average, de-jittered packet length (F5) in terms of the local TX clock may be generated. This value may be used to generate a clock signal. In an embodiment, the binary F5 value may be used in a numerical oscillator to generate the clock signal. If directly converted, a sample rate or sub-sample rate clock may be generated. In order to generate higher frequency clocks, the binary F5 value may be shifted to the right. For example, to generate a 256× clock, the binary F5 value may be shifted to the right by 8 positions.

Alternate Rounding

Many of the calculated values in the above-described algorithms are rounded off. To operate properly, this rounding may not include a statistical bits. If a statistical bias is introduced, an error buildup may be created, which may cause one or more variables to eventually wrap. To avoid this problem, a technique, referred to herein as "alternate rounding," may be used. This technique may guarantee that rounding is not statistically biased in one direction or the other.

The following example illustrates this. The following value (4-bit integer, 44-bit fraction) may be stored in a 48 bit shift register. The first 28 bits may be used as the rounded value. The other bits may be rounded and discarded.

0000.0000 0000 0001 0000 0100 1000 0000 0000 0000 0000 0000

If this value is shifted to the right by 7 bits (i.e., divided by 128), two fractional ones are displaced from the highest 28 bits.

0000.0000 0000 0000 0010 0000 1001 0000 0000 0000 0000

Alternate rounding is performed as follows: If the 25th fractional bit is a zero, the 24th bit is left unchanged (rounded down). If the 25th fractional bit is a 1, and at least one other bit to its right is a 1, add 1 to the 24th fractional bit (rounded up). This is an actual addition to the value. For example, if the first 24 fractional bits were all 1s, the added 1 would ripple all the way up into the integer bits. In the example above, a one would be added to the 24th fractional bit.

Statistically, having any of the values between 0000 0000 0000 0000 0001 and 0111 1111 1111 1111 1111 in the rightmost bits would round the value down (524,287 different values), Having any of the values between 1000 0000 0000 0000 0001 and 1111 1111 1111 1111 1111 in the rightmost bits would round the value up (again, 524,287 different values). The 0000 0000 0000 0000 0000 value is exactly zero (noting to round), so it isn't included. If the value 1000 0000 0000 0000 0000 is present in the rightmost 20 bits, it must be rounded up one time and rounded down the next time it occurs in order to maintain no statistical bias.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those of ordinary skill in the art which are also intended to be encompassed by the following claims.

SEQUENCE LISTING

Not Applicable

What is claimed is:

1. A method of limiting clock rate jitter between asynchronous devices in a network, the method comprising:
receiving a packet at a device, wherein the packet comprises a clock master packet length and a rounded-clock master packet length;
determining an incoming packet length by measuring a number of clock cycles required to receive the packet;
determining a difference between the incoming packet length and the clock master packet length;
filtering the difference using a low pass filter to determine an average slip rate value;
updating an accumulator value by adding the average slip rate value to the accumulator value; and
transmitting the packet with an adjusted packet length based on at least the updated accumulator value and the rounded clock master packet length, whereby transmission of the packet with the adjusted packet length limits clock rate jitter from the device.

2. The method of claim 1 wherein the adjusted packet length equals the rounded clock master packet length plus 1 if the accumulator value is greater than or equal to 1.

3. The method of claim 1 wherein the adjusted packet length equals the rounded clock master packet length minus 1 if the accumulator value is less than or equal to −1.

4. A system for limiting clock rate jitter between asynchronous devices in a network, the system comprising:
- a receive interface for receiving a packet including a clock master packet length and a rounded clock master packet length;
- a packet length determination module for determining an incoming packet length by measuring a number of clock cycles required to receive the packet;
- a comparison module for determining a difference between the incoming packet length and the clock master packet length;
- a low pass filter for filtering the difference to determine an average slip rate value;
- an accumulator containing an accumulator value;
- an update module for adding the average slip rate value to the accumulator value to produce an updated accumulator value; and
- a transmit interface for transmitting the packet with an adjusted packet length based on at least the updated accumulator value and the rounded clock master packet length, wherein transmitting the packet with the adjusted packet length limits clock rate jitter.

5. The system of claim 4 wherein the transmit interface sets the adjusted packet length to equal the rounded clock master packet length plus 1 if the accumulator value is greater than or equal to 1.

6. The system of claim 4 wherein the transmit interface sets the adjusted packet length to equal the rounded clock master packet length minus 1 if the accumulator value is less than or equal to −1.

\* \* \* \* \*